(12) United States Patent
Kumar et al.

(10) Patent No.: US 8,249,134 B2
(45) Date of Patent: Aug. 21, 2012

(54) HIGH IMPEDANCE STATE FOR DIGITAL SUBSCRIBER LINE TRANSCEIVERS ON COPPER PAIRS

(76) Inventors: Dasari Jagadish Kumar, Bangalore (IN); Ganesh Kumar Koppisetti, Bangalore (IN); Bibin George, Bangalore (IN)

( * ) Notice: Subject to any disclaimer, the term of this patent is extended or adjusted under 35 U.S.C. 154(b) by 1033 days.

(21) Appl. No.: 11/560,442

(22) Filed: Nov. 16, 2006

(65) Prior Publication Data

US 2008/0117956 A1     May 22, 2008

Related U.S. Application Data

(62) Division of application No. 09/771,113, filed on Jan. 26, 2001, now Pat. No. 7,177,349.

(60) Provisional application No. 60/178,631, filed on Jan. 28, 2000.

(51) Int. Cl.
*H04B 1/38* (2006.01)
(52) U.S. Cl. ........ 375/219; 375/220; 375/257; 375/258; 375/295; 375/316; 455/39; 455/73; 455/91; 370/272; 370/273; 370/276; 370/297; 379/93.01; 379/156; 379/398; 379/399.01
(58) Field of Classification Search .................. 375/219, 375/220, 257, 258, 295, 316; 455/39, 73, 455/91; 370/272, 273, 276, 297; 379/93.01, 379/156, 398, 399.01
See application file for complete search history.

(56) References Cited

U.S. PATENT DOCUMENTS

| 4,620,310 | A | * | 10/1986 | Lvovsky et al. | 375/288 |
|---|---|---|---|---|---|
| 4,637,073 | A | * | 1/1987 | Selin et al. | 455/78 |
| 4,775,864 | A | * | 10/1988 | Herman | 370/282 |
| 4,973,940 | A | * | 11/1990 | Sakai et al. | 375/258 |
| 5,125,006 | A | * | 6/1992 | Marinaro | 375/219 |
| 6,078,613 | A | * | 6/2000 | Bingel | 375/220 |
| 6,611,552 | B2 | * | 8/2003 | Beck | 375/219 |
| 2001/0040917 | A1 | * | 11/2001 | Kumar et al. | 375/219 |

* cited by examiner

*Primary Examiner* — Leon Flores
(74) *Attorney, Agent, or Firm* — Husch Blackwell LLP

(57) ABSTRACT

The invention relates to methods and a high speed communication device that allow one of a plurality of high speed communication devices connected to a transmission line having a normal impedance to effectively receive data.

The high speed communication device can include a transmission line interface connected to the transmission line, a receiver connected to the transmission line interface, and a transmitter selectively coupled to the transmission line interface. The transmitter can have an impedance substantially equal to the normal line impedance.

The high speed communication device can present a high impedance to the transmission line with respect to the normal line impedance when the transmitter is not coupled to the transmission line interface, and the high speed communication device can present an impedance to the transmission line that is substantially equal to the normal line impedance when the transmitter is coupled to the transmission line interface.

10 Claims, 11 Drawing Sheets

Implementation 3

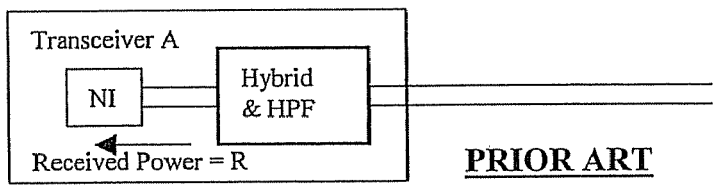
Figure 1: Single Transceiver on a Line
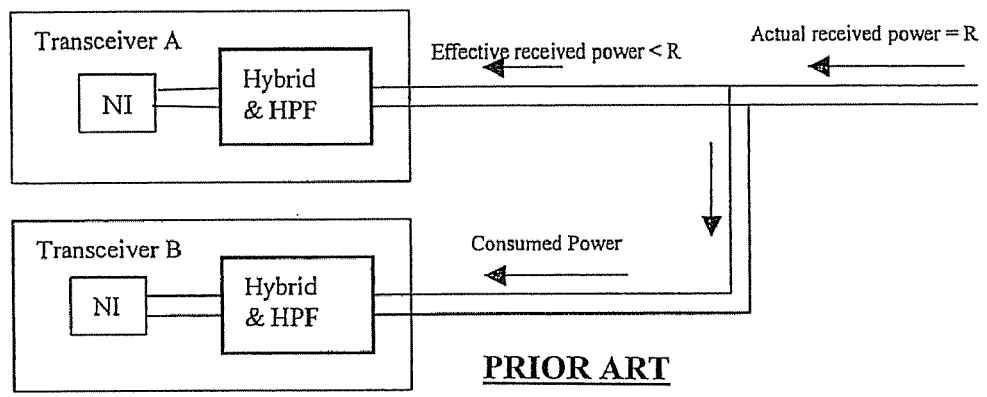
Figure 2: Attenuation of the Received Signal
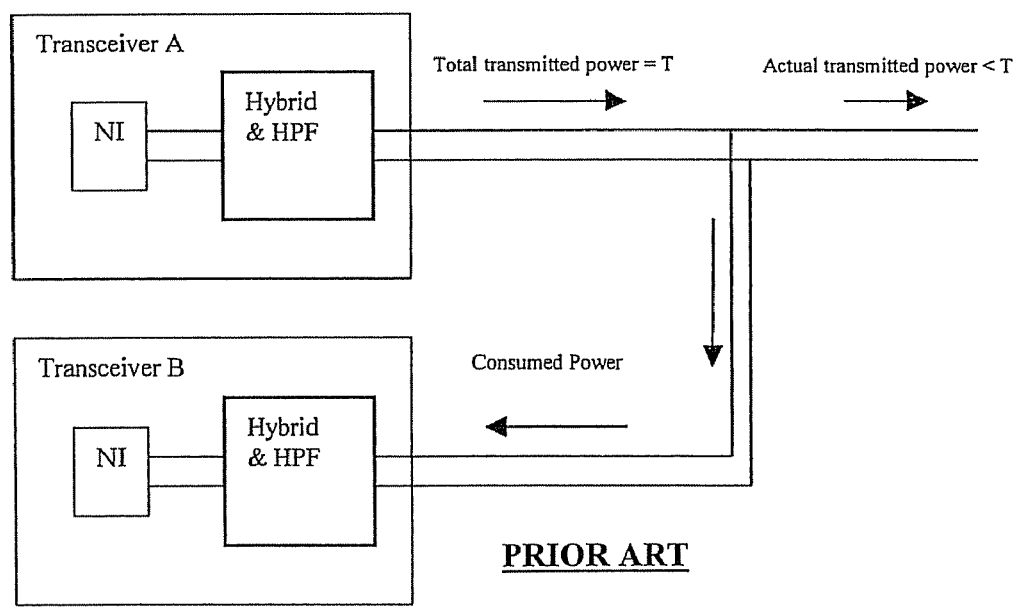
Figure 3: Attenuation of Transmitted Signal

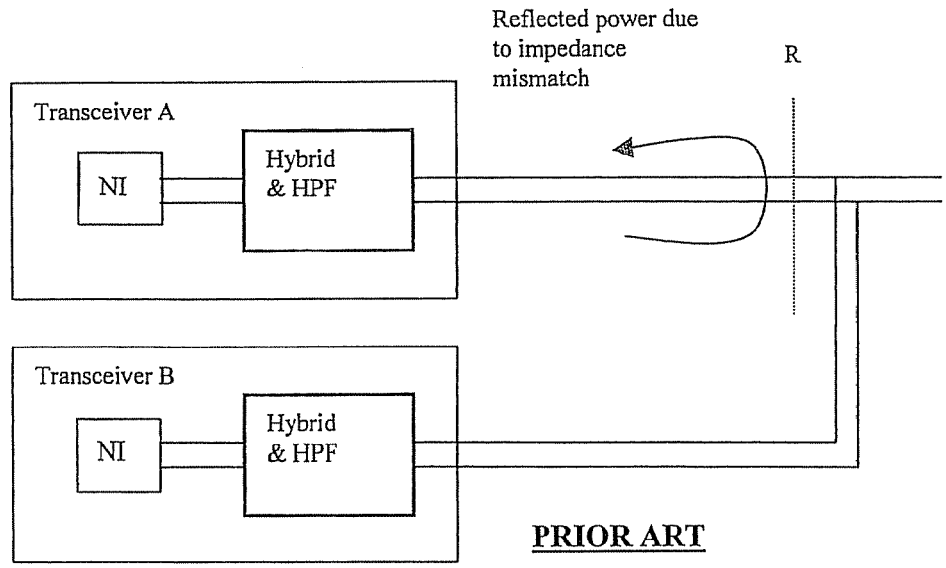
Figure 4: Echo of the Transmitted Signal
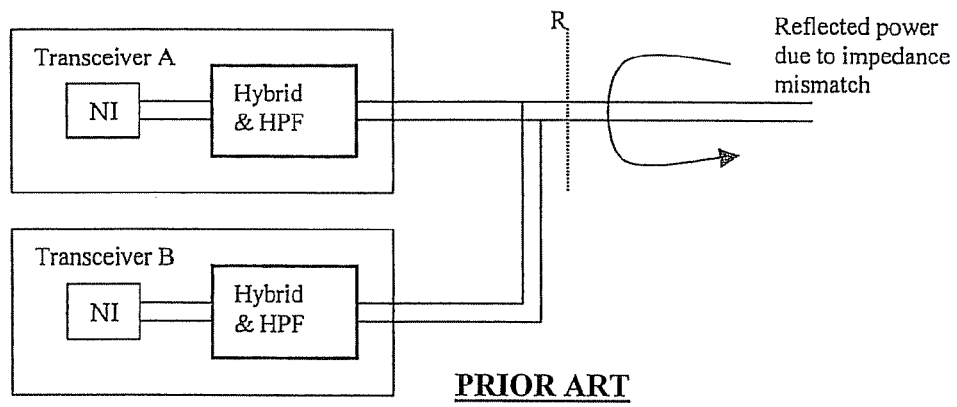
Figure 5: Echo of the Received Signal
Legend
NI: Normal Impedance
HI: High Impedance
HPF: High Pass Filter

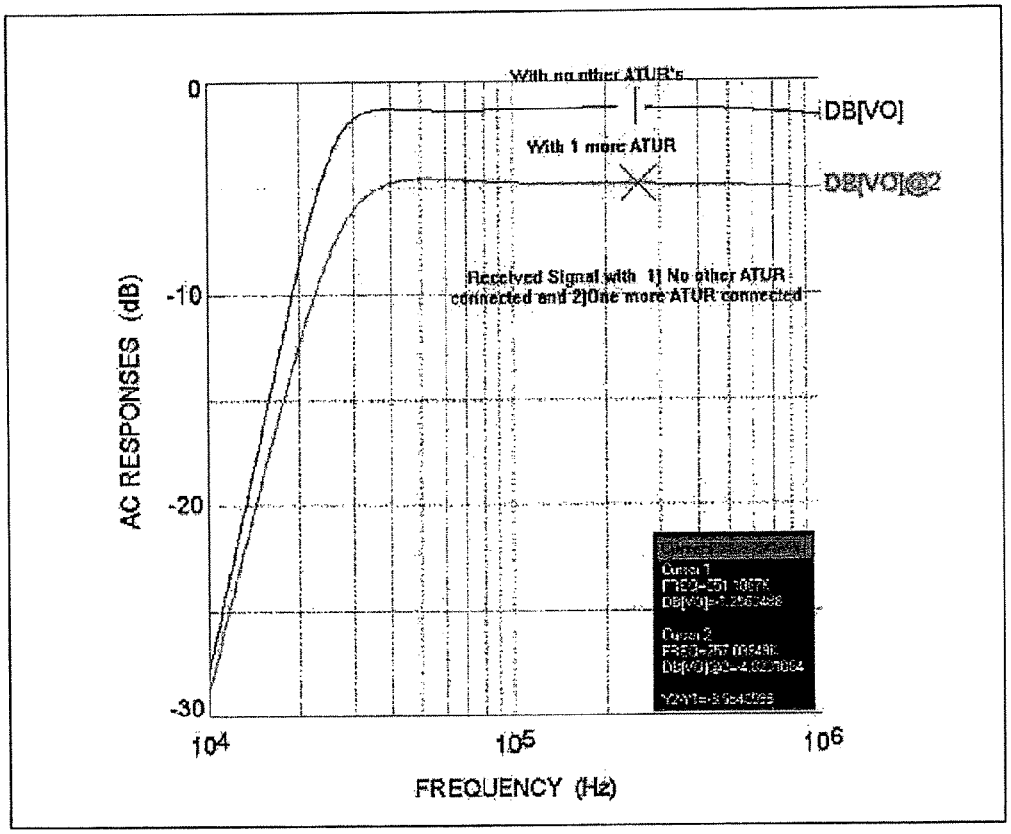
Figure 6: Reduction in the Signal Received by the ATU-R

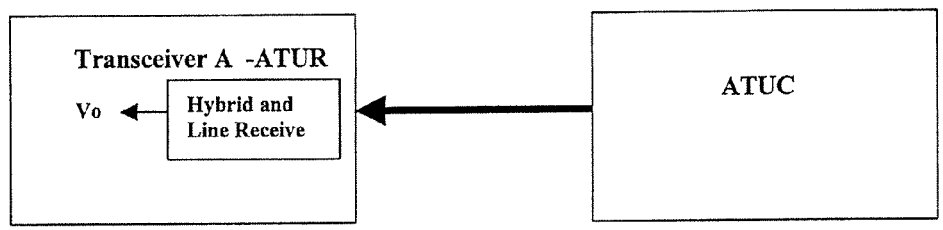
Figure 6a: Signal received when only one ATU-R is connected
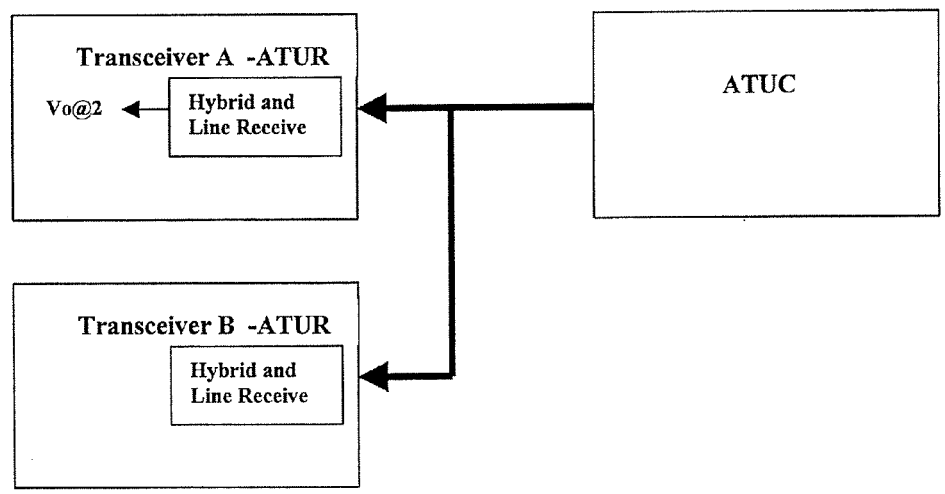
Figure 6b: Signal received when an additional ATU-R is connected to the same line

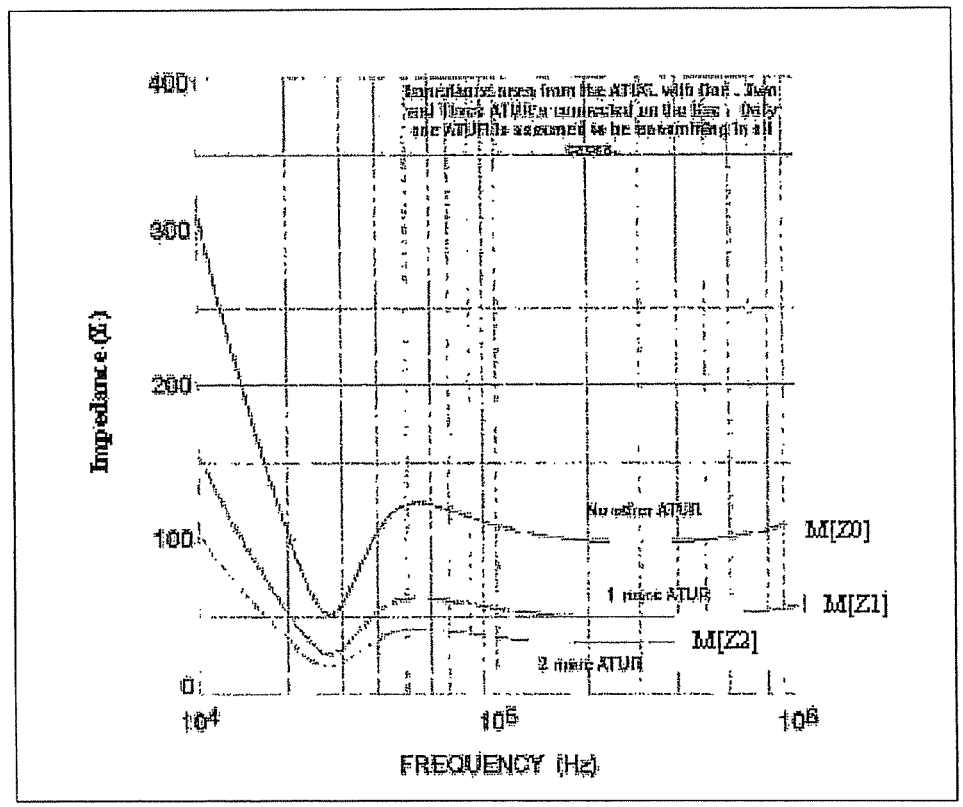
PRIOR ART
Figure 7: Reduction in the Effective Impedance with Multiple ATU-Rs

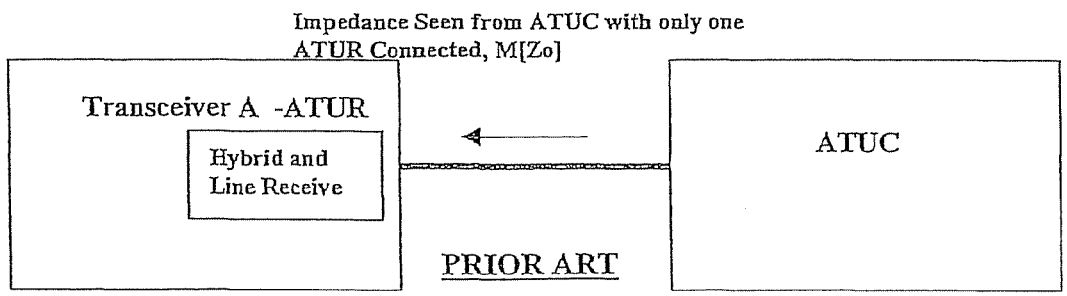
Figure 7a: Impedance seen by the ATU-C with one ATU-R connected to the line
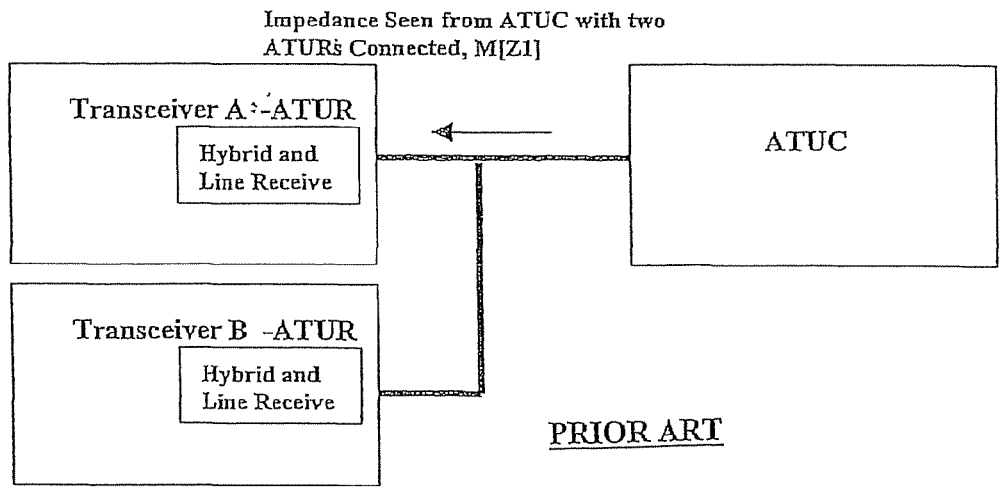
Figure 7b: Impedance seen by the ATU-C with two ATU-Rs connected to the line
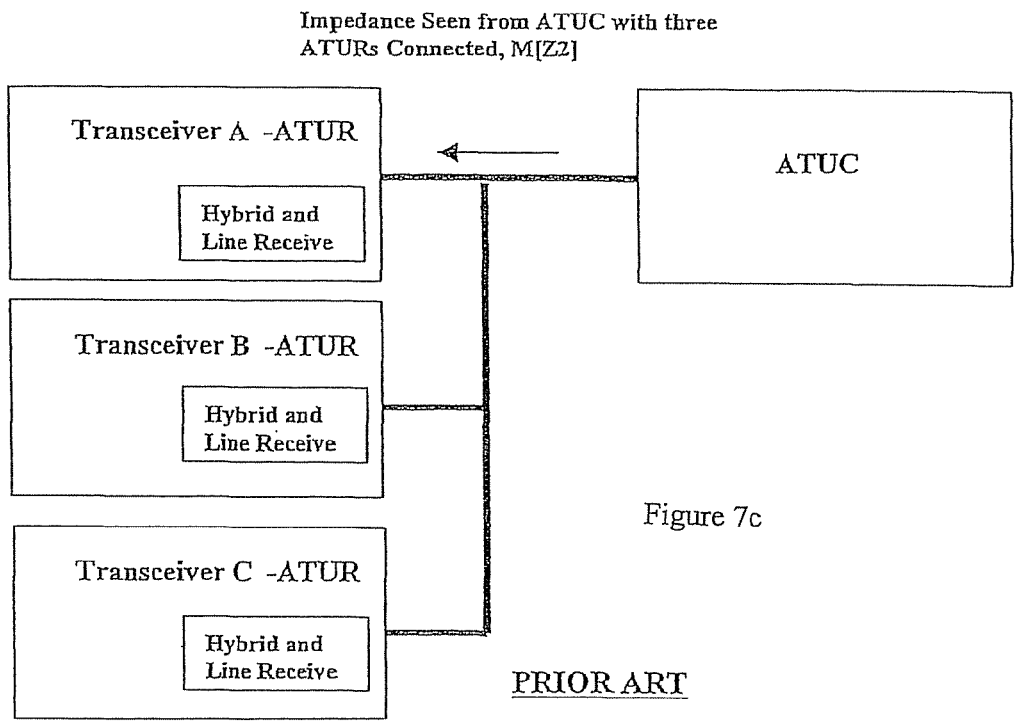
Figure 7c

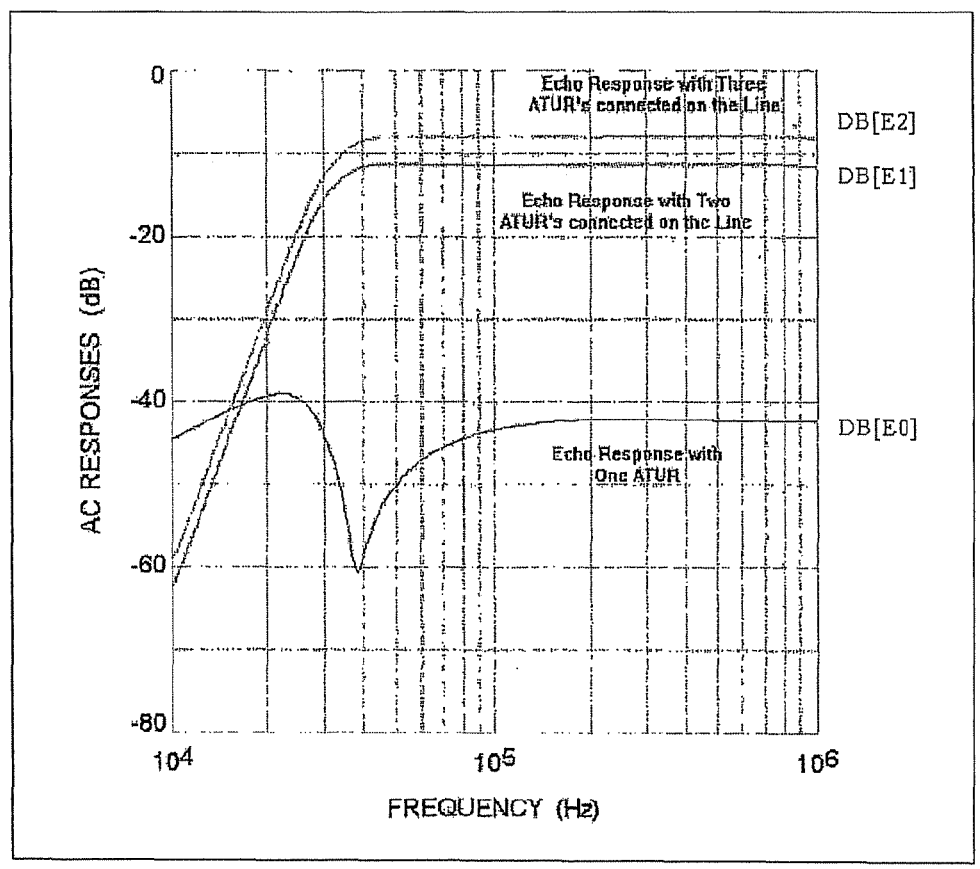
PRIOR ART
Figure 8: Increase in the Echo at the ATU-R due to other ATU-Rs

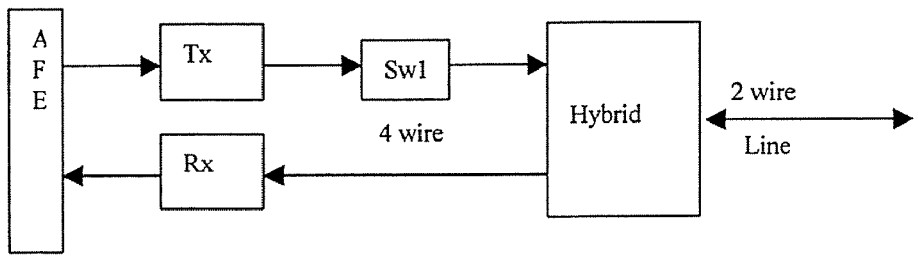
Figure 9: Implementation 1
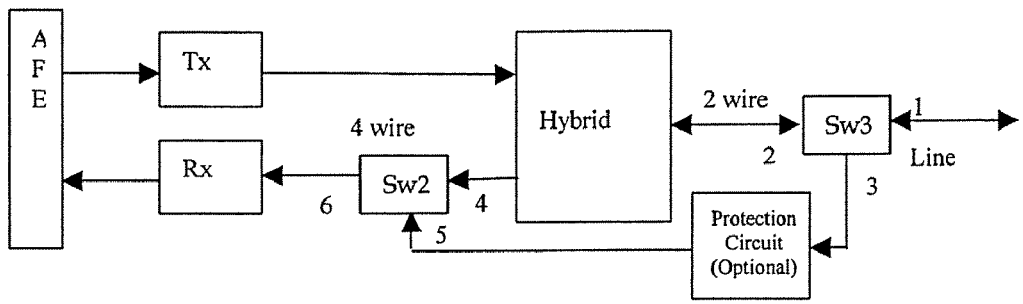
Figure 10: Implementation 2
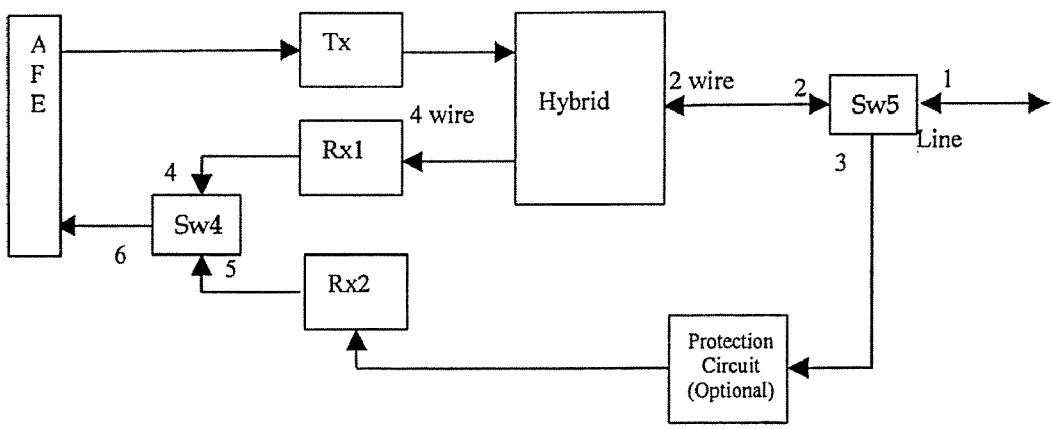
Figure 11: Implementation 3
Legend: Tx: Transmitter, Rx: Receiver, Sw: Switch, AFE: Analog Front End.

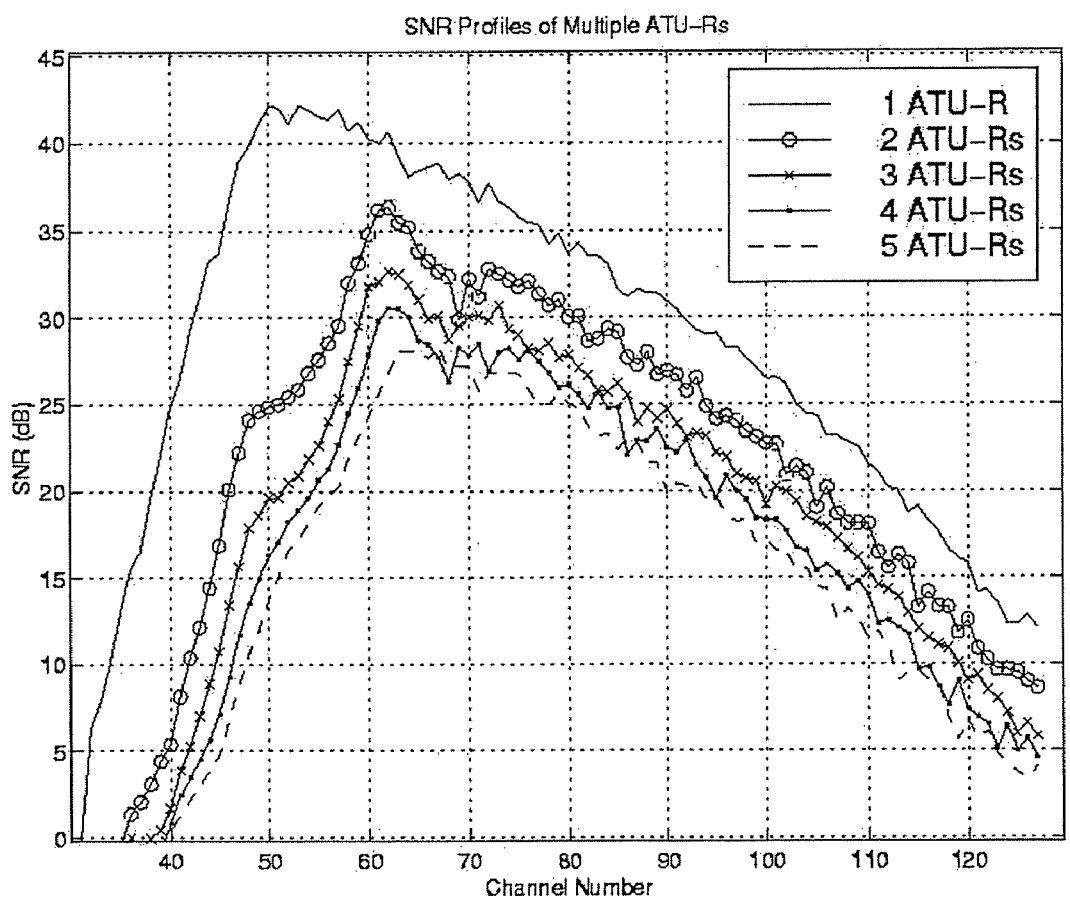
Figure 12: Simulation results of SNR profiles for multiple ATU-Rs

HIGH IMPEDANCE STATE FOR DIGITAL SUBSCRIBER LINE TRANSCEIVERS ON COPPER PAIRS

FIELD OF THE INVENTION

The invention relates to high speed communication devices for use as one of a plurality of high speed communication devices connected to a transmission line having a normal or characteristic impedance.

BACKGROUND OF THE INVENTION

Communications transceivers such as telephones, fax machines and voice modems, that are designed to work on copper twisted pair wire communication lines and transmit signals in the 200 Hz to 4 kHz frequency range support the connection of more than one transceiver at a remote customer end of the line. This is generally possible through the definition of two states of such equipment called the On-hook and Off-hook states. These are derived from conventional telephony terms that indicate whether the handset of the telephone is on or off hook. Equipment in the Off-hook state is active and participates in a communication session. Equipment in the On-hook state is inactive and does not participate in a communication session, has negligible impact on the line, and can be ignored by other equipment connected to the line. Typically, at any given instant, only one piece of equipment connected to the line is in the Off-hook state, while others are in the On-hook state.

Although work on DSL transceivers dates back to the late nineteen-eighties and early nineteen-nineties, present Digital Subscriber Line (DSL) transceivers and other high speed communication devices are not designed to support the connection of more than one transceiver or transmitter at any given end of the line. Additional high speed communication devices, or DSL transceivers, which is one type of high speed communication device, cannot be connected to either end of the line without incurring a significant loss in the quality of transmission and reception of signals.

Examples of high speed communication systems, such as DSL communications systems, are Asymmetric DSL (ADSL) and Very high speed DSL (VDSL). xDSL equipment can generally be broken down into two basic units, the xDSL Transceiver Unit Central Office (xTU-C) and xDSL Transceiver Unit Remote (xTU-R).

In theory, a copper twisted pair of wires of infinite length has a characteristic impedance for a given frequency. In practice, however, the copper twisted pair of wires has a finite length and a normal impedance. The normal impedance typically has a slightly lower impedance than the characteristic impedance but is substantially equal to the characteristic impedance. In this disclosure, the terms normal impedance and characteristic impedance are used interchangeably.

DSL transceivers in use are only capable of presenting an impedance that is substantially equal to the characteristic impedance of the copper twisted pair of wires over the transceivers' frequency range of operation. This impedance is generally 100 Ohms. Ordinarily, this ensures that echo is kept at a minimum and maximum power transfer is effected into or from the line, as shown in FIG. 1. This result does not follow if more than one transceiver is connected at any end, in parallel.

Several problems arise if more than one DSL transceiver presently in use is connected at one end of the line. For example, problems related to attenuation, echo, contention, and non-deterministic impedance when powered-off may arise. This is because, typically, the additional transceiver or transceivers offer the same impedance, i.e. the normal impedance, across the line.

First, the additional transceiver(s) causes signal power attenuation. Specifically, the power of the signal received from the other end of the line is divided into each of the transceivers at the end where more than one transceiver is connected (parallely connected transceivers). At the parallely connected end, as shown in FIG. 2, each transceiver receives less power than it would have received if it were the only one connected at that end.

FIG. 6 summarizes simulations that have been performed on SPICE to measure the impedance presented to the line when two ATU-Rs are connected in parallel. As shown in FIG. 6, the power of a signal received by an ATU-R is reduced by about 4.8 dB if another ATU-R, which also has a termination of 100 Ohms, is connected in parallel. Here the loop has not been included. Depending on the loop length, the power reduction can be up to 6 dB for one additional ATU-R.

As shown in FIG. 7, the impedance presented to the line at the parallely connected end (the effective line impedance) is further reduced when more than one ATU-R, each terminated with the normal impedance of 100 Ohms, is connected in parallel. Because the line is now terminated with a lower impedance than the characteristic or normal line impedance, the signal power transfer from the transmitter at the other end of the line into the line will be less than the possible maximum (as per the Maximum Power Transfer Theorem: Schaum's Outline Series Theories And Problems Of Electric Circuits By Joseph A Edminister, Published By McGraw Hill Book Company (August 1965). This reduced power then travels along the line and further gets distributed amongst the ATU-Rs connected at the end of the line as mentioned above.

Further, as shown in FIG. 3, each transceiver connected in parallel to a transmitting transceiver acts as a load on signals transmitted by the transmitting transceiver. Hence, the total power transmitted onto the line is less than the power that would have been transmitted if only one transceiver was connected at the transmitting end of the line. The transceiver at the other end of the line (distant-receiving transceiver), therefore, receives signals having significantly reduced power than the distant-receiving transceiver would have received if a single transceiver were connected at the transmitting end of the line.

Second, the connection of additional transceivers in parallel also results in increased echo. Presently, transceivers are designed to transmit onto a line terminated at the other end by the characteristic impedance. When more than one transceiver is connected to a transmitting end of the line in parallel, as depicted in FIG. 4, the impedance presented to the transmission line by all the transceivers connected in parallel at the transmitting end of the line is much less than the characteristic or normal impedance. This will result in echo at the transmitting end of the line.

Echo, at any interface, is dependent on line termination impedance, and generally the effectiveness of echo suppression and cancellation circuits is dependent on the termination presented by the interface. Connection of more than one transceiver on the line changes this termination and thus increases the echo. FIG. 8 summarizes the results of a simulation and shows the drastic increase in the echo seen by the transmitting ATU-R when additional ATU-Rs with a termination of 100 Ohms are connected in parallel.

As shown in FIG. 5, additional transceivers connected in parallel at a receiving end will also present impedance that is less than the characteristic line impedance to signals arriving at the receiving end of the line. This will cause a larger reflection of the signal back into the line resulting in a larger echo at the interface 'R', resulting in an increased echo at the distant-transmitting transceiver.

The transceivers will hence be subject to higher echo, causing complications associated with increased echo in the performance of the transceivers. Echo, if not cancelled or suppressed, would reduce the effective dynamic range of the receiver and could, in a worst case scenario, saturate the receiver altogether. Reduction of the dynamic range could adversely affect the performance of the receiver resulting in lower bit rates and saturation could cause non-linear distortion also resulting in lower bit rates.

Simulations have been performed on MATLAB, for a specific test case (Case#3 in Annex D of the ITU-T G.992.2 standard), which involves the loop T1.601#7 (13.5 kft plain loop) and a 24 DSL NEXT (Near End crosstalk) and a −140 dBm/Hz background noise (ITU-T Recommendation G.992.1 (06/99), "Asymmetric Digital Subscriber Line (ADSL) Transceivers", International Telecommunication Union). One active ATU-R modem communicating with the ATU-C and a number of passive ATU-Rs connected at the remote end have been simulated. The SNR profile is simulated for one ATU-R and for each additional passive ATU-R (max of four). The results are shown in FIG. 12. From this figure we see that the SNR profile drops drastically, even if one additional ATU-R is added.

The following table shows the bit rates generated for the above SNR profiles, after giving 4 dB margins.

| Number of Additional ATU-Rs | Bit Rates (kbps) |
| --- | --- |
| 0 | 2208 |
| 1 | 1440 |
| 2 | 1120 |
| 3 | 928 |
| 4 | 800 |

Third, when more than one transceiver has to be connected on the same medium, contention problems arise. Contention is the inadvertent, simultaneous transmission of similar signals by more than one transmitter onto the same transmission medium, at the same end in particular. This could result in signal corruption.

It has been suggested, in line with the prevalent method of avoiding contention in data communication systems, that the transceivers could check or sense the medium to determine whether the medium is idle before actually transmitting signals. This is possible if the receiver can probe for signals on the line without loading existing signals, if any, on the line to avoid corrupting existing signals and to prevent disrupting communication in progress between other transceivers. However, if a transceiver that has a normal impedance probes the line, it will also load the line. Therefore, it is desirable for a receiver to present a high impedance across the line to probe. Existing DSL transceivers are not capable of presenting a high impedance across the line while receiving the signal and hence could disrupt on-going communication.

Fourth, the impedance of existing DSL transceivers, when powered off, is not known. This is because the network that constitutes the impedance seen by the line may contain active devices, and the characteristics of active devices cannot be determined in the power-off condition. Therefore, if a current DSL transceiver remains connected to the line when powered off, it could be presenting a low impedance across the line and hence, any of the other transceivers connected to the same line are not guaranteed to work at their rated performance level or may not work at all. Even if transceivers had a mechanism incorporated to ensure automatic line disconnection when powered off, they would immediately get connected to the line and offer normal impedance when switched on, and could thus potentially disturb ongoing communication on the line. The user would have to ensure that other modems connected to the line are not communicating before switching the modem on. Therefore the mechanism stated above, although automatic in one sense, would not actually serve its purpose.

Given the problems that arise when more than one DSL transceiver, presently in use, is connected across the same line, it has been suggested that the only way to resolve the aforementioned problems is to check and ensure that all other transceivers are disconnected from the line before using any one transceiver on the line. All users would have to carry out this cumbersome procedure whenever they want to use their DSL modem. As explained above, even powering off the other transceivers may not help. In practice it would render the use of multiple DSL transceivers on the same line very unwieldy as compared to the use of voice band transceivers, the predecessors of the DSL transceivers. It should be noted that although the above discussion refers to DSL transceivers, the problems noted above apply to other high speed communication devices as well, such as high speed communication transmitters and co-axial modems for example. Accordingly, there continues to be a need for a high speed communication device that resolves the problems mentioned above.

BRIEF SUMMARY OF THE INVENTION

The invention relates to high speed communication devices configured to allow a plurality of high speed communication devices to be connected to an end of a transmission line having a characteristic or normal impedance and effectively receive data through high and normal impedance states.

A high speed communication device is provided. The high speed communication device includes a first receiver, a line interface, which may be a hybrid circuit, and a transmitter selectively coupled to the transmission line. In a high impedance state, the transmitter is not coupled to the transmission line and the high speed communication device presents a high impedance to the transmission line with respect to the normal impedance of the transmission line. In a normal impedance state, the transmitter is coupled to the transmission line and the high speed communication device presents an impedance to the transmission line substantially equal to the normal impedance of the transmission line.

The high speed communication device is open to several embodiments. For example, the transmitter may be selectively coupled to the hybrid circuit by a first switch and the hybrid circuit may be connected to the transmission line in a first embodiment. In a second embodiment, the first switch may be positioned within the transmitter.

In a third embodiment, the transmitter may be connected to the hybrid circuit, which can be selectively coupled to the transmission line by a first switch. The receiver may be selectively coupled to the hybrid circuit by a second switch.

In a fourth embodiment, the high speed communication device may further include a second receiver. The transmitter can be connected to the hybrid circuit, which can be selectively coupled to the transmission line by a first switch. The first receiver can be connected to the hybrid circuit, and the second receiver can be selectively coupled to the transmission line by the first switch.

Pursuant to a first aspect of the invention, high speed communication devices in the high impedance state present a high impedance with respect to the characteristic or normal line impedance, do not transmit data, but can receive data. Pursuant to a second aspect of the invention, one of the plurality of devices is in the normal impedance state when it presents an impedance substantially equal to the characteristic or normal line impedance, and is capable of transmitting data, at all times. Pursuant to the second aspect, the device may switch out of or into the normal impedance state, and another of the plurality of devices may switch into or out of the normal impedance state.

A system is also provided that includes at least one central office high speed communication device connected to a first end of a transmission line having a normal impedance, and a plurality of remote high speed communication devices connected to a second end of the transmission line. The plurality of remote high speed communication devices can be capable of switching from an active state, when they can transmit and receive data across the transmission line, and a high impedance state, when they can probe and sense the transmission line for data. Each of the plurality of remote high speed communication devices can have a different configuration. For example, one of the plurality of high speed communication devices may take the form of the first embodiment described above, while another of the plurality of communication devices may take the form of the third embodiment described above.

Pursuant to aspects of the invention, protocols may dictate when one of the plurality of high speed communication devices can transmit data or incorporate data that indicates an intended device.

BRIEF DESCRIPTION OF THE DRAWINGS

FIG. 1 depicts a transceiver in use connected to a transmission line;

FIG. 2 depicts the power attenuation of received signals when sent to a plurality of transceivers in use connected in parallel to a transmission line;

FIG. 3 depicts the power attenuation of transmitted signals when sent by a plurality of transceivers in use connected in parallel to a transmission line;

FIG. 4 depicts the echo of transmitted signals when sent by a plurality of transceivers in use connected in parallel to a transmission line;

FIG. 5 depicts the echo of received signals when sent to a plurality of transceivers in use connected in parallel to a transmission line;

FIG. 6 is a graph that depicts the reduction in a signal received by a remote high speed communication transceiver when two high speed communication transceivers are connected in parallel;

FIG. 7 is a graph that depicts the reduction in the effective impedance when a plurality of high speed communication transceivers are connected to an end of a transmission line;

FIG. 9 depicts a first embodiment of a high speed communication transceiver incorporating a receiver, a transmitter, a hybrid, and a switch to effectuate high and normal impedance states pursuant to aspects of the invention;

FIG. 10 depicts a third embodiment of a high speed communication transceiver incorporating a receiver, a transmitter, a hybrid, and two switches to effectuate high and normal impedance states pursuant to aspects of the invention;

FIG. 11 depicts a fourth embodiment of a high speed communication transceiver incorporating a first receiver, a second receiver, a transmitter, a hybrid, and two switches to effectuate high and normal impedance states pursuant to aspects of the invention;

FIG. 12 is a graph that depicts simulation results of SNR profiles for multiple high speed communication transceivers.

DETAILED DESCRIPTION OF THE INVENTION

Figures 8A, 8B, 8C:
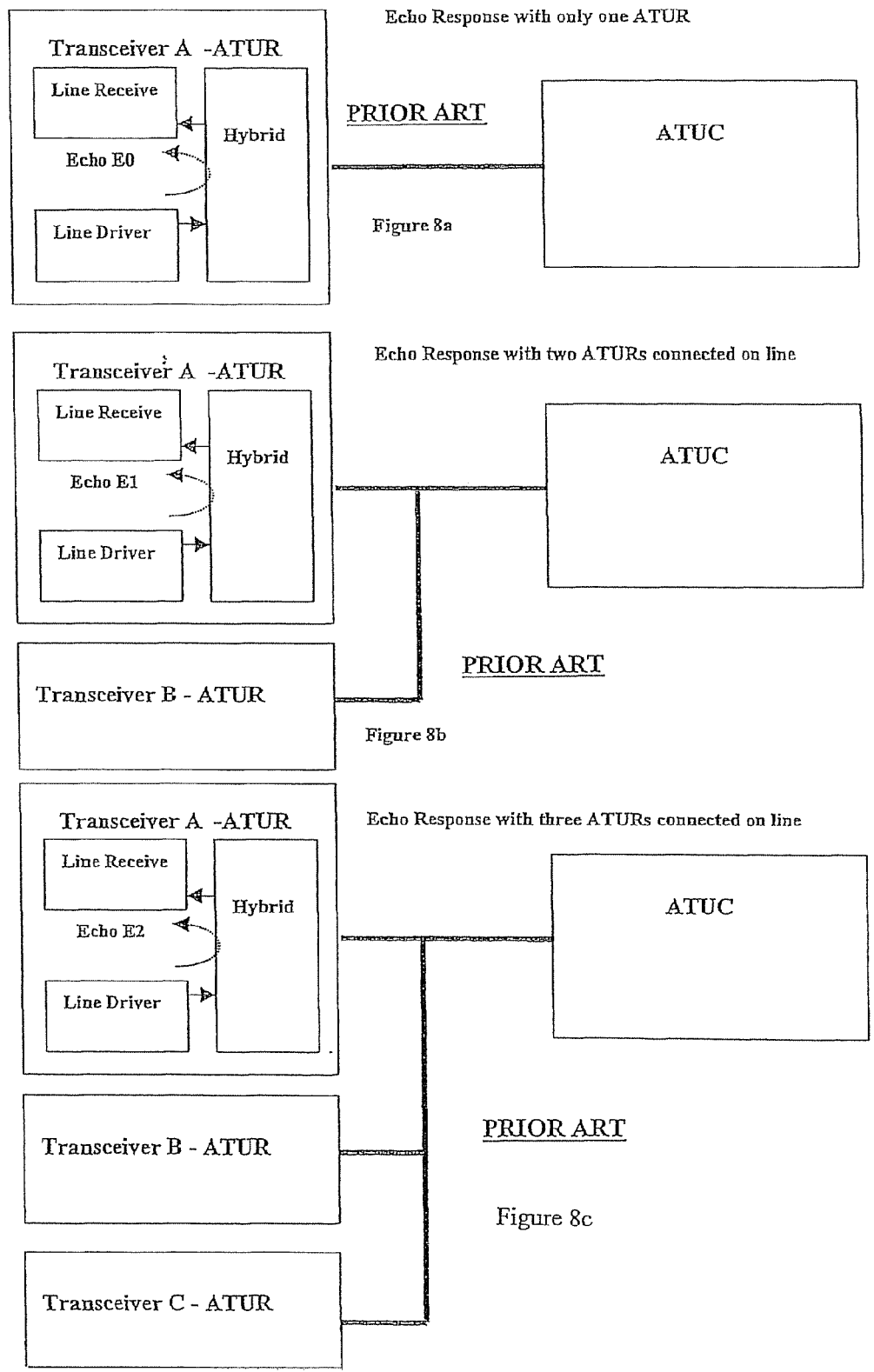
FIG. 8 is a graph that depicts the increase in echo at a remote high speed communication transceiver that results from other remote high speed communication transceivers.

The following specification describes specific methods and embodiments of the invention with the understanding that the scope of the invention is not to be limited to the specific methods and embodiments depicted below. Those skilled in the art will recognize that several other methods and embodiments, not described below, still fall within the scope and spirit of the invention.

Pursuant to one aspect of the invention, problems encountered when connecting high speed communication devices in parallel are addressed by defining a state for the parallely connected devices, the 'High Impedance' (HI) state of a high speed communication device.

High speed communication devices in the HI State, present a high impedance across the line with respect to the characteristic or normal line impedance, do not transmit signals, and can receive signals from other transceivers transmitting on the same line.

Pursuant to a second aspect of the invention, one of the parallely connected high speed communication devices at an end of the line, is in a normal impedance ("NI") state, at any given time. For example, the high speed communication device in the NI state could exchange messages with a high speed communication device at the other end of the twisted pair line, while the remaining parallely connected high speed communication devices on the transmitting end stay in the HI state. The high speed communication device in the NI state would thus be active, as described below. Another high speed communication device at the aforementioned parallely connected end can switch to the NI state and the previous high speed communication device in the NI state would change to the HI state, as described below.

Those of ordinary skill in the art will recognize that there may be different types of high speed communication devices connected to the same line, such as DSL transceiver modems (ADSL, HDSL, VDSL, etc), co-axial modems, or high speed communication transmitters. Consequently, the frequency spectrum of usage could be different. Because the CI of the line is different at different frequency ranges, the value of the HI should be defined to address the highest of the CIs, unless other precautions are taken, such as, for example, the use of POTS splitters, to isolate the DSL transceivers from each other. The POTS splitter isolates the ADSL transceivers on the line from the POTS equipment and thus the low impedance offered by the POTS equipment in the Off Hook State would not affect the impedance of the line at the ADSL frequencies. In the discussion below, high speed communication transceivers, and in particular DSL transceiver modems, are discussed in detail. However, those of ordinary skill in the art will recognize that much of the discussion also applies to other high speed communication devices, such as, for example, high speed communication transmitters.

Those of ordinary skill in the art will recognize that, the impedance value $Z_{HI}$ in the HI state could also depend on the number of transceivers in the HI state that can be connected (per system requirements) in parallel, to one transceiver in the NI state. That is, if the number of parallely connected transceivers is 'n', the effective parallel combination of the 'n' high impedances should not affect the signal on the line. Therefore:

$$Z_{HI}/n >> Z_{NI} \text{ or } Z_{HI} >> Z_{NI}*n$$

In general, the impedance of the parallely connected transceivers in the HI state should be high enough, with respect to the CI of the line in the frequency range of operation of all the transceivers, to ensure that signal loading on the line by the transceivers in the HI state is negligible. The ideal HI value is infinite.

TABLE 1

| Transceiver State | Impedance |
|---|---|
| UNPOWERED | $Z_{HI}$ |
| Disabled (Powered with transmitter and receiver inactive) | $Z_{HI}$ |
| Inactive (Powered with transmitter inactive and receiver active to detect signals) | $Z_{HI}$ |
| Active (powered with transmitter and receiver active and initializing or in showtime) | $Z_N$ |

Table 1 summarizes the impedance transceivers should present across the line at different transceiver power states, wherein $Z_{HI}$ is the impedance in the High Impedance state and $Z_N$ is the impedance in the Normal Impedance State.

In practice, while more than one DSL transceiver can be parallely connected to an end of the line, at any given point of time, only one of these DSL transceivers can transmit data across the line. The following summarizes one possible state transition scheme pursuant to aspects of the invention. To start, assume that all parallely connected transceivers at a second end of the line are kept in the HI state. Two cases are possible:

In a first case, the transceiver at a first end of the line might initiate a transaction by transmitting a predefined signal. In this case, each parallely connected transceivers at the second end will receive the initiation signal and only the transceiver to which the signal is intended will change over to the NI state and respond with the transmission of an appropriate signal(s). Those skilled in the art will recognize that several protocols known in the art are capable of indicating the intended transceiver.

In a second case, one of the parallely connected transceivers at the second end might initiate a transaction based on a protocol. The protocol may be based on time slots or line sensing. For example, for a line sensing based protocol, the transmitting modem can check if the line is idle (no signal) for a pre-defined duration of time while in the HI State, and if the line is idle, the modem can change over to the NI state and start transmitting a signal. The transmitting modem would know that messages arriving from the first end of the line are directed towards it. Two or more transceivers may start transmitting at the same time and cause a collision. Those skilled in the art will recognize that there are protocols to detect and resolve such collisions.

In either case, transceivers not transmitting signals and to which signals are not intended, can wait until the intended transceivers and transmitting transceivers stop transmitting, and wait until the line becomes idle for a pre-defined minimum duration. Therefore, at a line end, only one parallely connected DSL transceiver that transmits shall continue to be in, or change over to, the NI state for transmission purposes. After transmission is completed, it can revert to the HI state, or remain in the NI state.

It should be noted that if each transceiver connected to one end of a long line remains in the HI state, as assumed in the earlier paragraph, then the line will be effectively unterminated at that end, meaning an impedance mismatch would result. Consequently, signals transmitted by transceivers at the other end of the line may not be received properly by the parallely connected transceivers in the HI state because of reflections at the unterminated end. Although transceivers in the HI state are capable of receiving signals on the line, the signal might occasionally be sufficiently distorted from reflections caused by the unterminated end to prevent proper reception.

There are several methods to address the unterminated end problem described above. For example, in one method, one transceiver at either end of the line can remain in the NI state, even during the idle states of the line. The impedance presented by this transceiver can then provide sufficient line termination to prevent the signal from the other end of the line from being reflected by the impedance mismatch at the unterminated line end. Therefore, other transceivers connected at the same end would receive signals properly, even though they would be in the HI state. After determining the intended transceiver to which the transmission is directed, that intended transceiver will either continue to remain in, or changeover to the NI state, and the other parallely connected transceivers will either continue to remain in, or changeover to the HI state.

In another example, all the transceivers connected in parallel at one end of a transmission line could be in the HI state during the idle state of the line, provided an incorporated communication protocol includes an initiation phase (For example, the hand shake phase defined in ITU-T Recommendation G.994.1 (06/99), "Hand Shake Procedures for DSL Transceivers", International Telecommunication Union). The initiation phase can be designed to be sufficiently robust to receive signals and determine an intended transceiver despite problems arising from improper line termination and signal distortion. The intended transceiver could change over to the NI state and the other transceivers could remain in the HI state.

The two DSL transceivers that communicate with each other may be connected in various manners, for example they may each be at separate ends of the transmission line, at the same end of the transmission line, or at the end of bridge taps.

Bridged taps are unused twisted-pair cables attached to a telephone subscriber loop. For example, bridged taps are additional, unused twisted pairs of wires that are connected to the main subscriber line used for connecting telephones to a central office. The bridged taps could have been lines that were previously used by other subscribers who subsequently surrendered their lines. The service provider either did not disconnect the lines, or left them as is, hoping to use them later and extended the line for the use of another subscriber. Typically, these bridged taps have very little or no affect on signals at low (POTS) frequencies, and hence do not impact the use of telephones. Bridged taps, however, have significant effect on signals of higher frequencies.

Typically, bridged taps should not be terminated in order to allow the DSL systems to function properly. Consequently, it was not possible to connect DSL transceivers that only presented a normal impedance at the ends of bridged taps. Pursuant to aspects of the invention, DSL transceivers in the HI state also facilitate connecting DSL transceivers at bridged tap ends in addition to regular line ends. Like the scenarios discussed above, at any given time, only one DSL transceiver should be in the NI mode while the rest are in the HI state for bridged tap end connections.

The aspects of the invention address several problems discussed above. For example, the invention ensures that the quality of signals received by a plurality of transceivers connected to a second end of a line would be the same as if the signals were received by a single transceiver connected to the second end of the line.

When transmitting signals using transceivers that incorporate aspects of the invention, the transmitted signal will not be loaded by other transceivers connected in parallel to the transmitting transceiver at a first end of the transmission line. This ensures that the power transmitted by the transceiver will be transmitted onto the line. Hence, the power received by a transceiver connected at a distant-receiving end of the line would be the same as if the transmitting transceiver were the only one connected to the first end.

The signal echo problem caused by a plurality of digital communication transceivers is also addressed by the invention. Pursuant to the second aspect of the invention, one receiving transceiver on a second end of the line would be in the NI state while other parallely connected receiving transceivers at the second end would be in the HI state. Therefore, the effective impedance presented by the parallely connected receiving transceivers would be substantially equal to the normal line impedance. Consequently, the echo that a transmitting transceiver at the first end is subject to from the parallely connected transceivers at the second end would be substantially equal to the echo received if only one receiving transceiver were connected at the second end.

Those of ordinary skill in the art recognize that DSL transmitters are voltage sources and that DSL receivers are voltage sensors. Therefore, basic circuit law shows that if a transceiver that is configured to drive a signal onto a medium of impedance $Z_N$ has a source impedance of $Z_{HI}$, where $Z_{HI}$ is $>>Z_N$, then the signal power actually transmitted onto the line would be small, i.e., $Z_N/(Z_N+Z_{HI})$ times the signal power actually outputted by the transceiver. Therefore, it is difficult for a transceiver in the HI state to transmit a signal of sufficient power onto a medium. To the contrary, a receiver connected in parallel to the transmitter can still receive signals while presenting a high impedance across the line. The receiver, therefore, does not load the line because of the high impedance. Therefore the HI state, would enable a parallely connected transceiver to receive and/or probe the line for signals while not loading the signals, if any, on the line and thus check if the line is in use, before initiating a transmission.

The problem caused by indeterminate impedance of a transceiver when it is powered-off is resolved by ensuring that transceivers are in the HI state when they are powered-off. Thus, the transceivers do not have to be disconnected from the line.

On the other hand, when a modem is switched on, and the transceiver changes from the 'Powered off' state to the 'Inactive' state, as shown in table 1 above, the invention allows the transceiver to continue in the HI state and probe the line for signals without distorting them, before it starts transmission.

Those skilled in the art will recognize that the HI and NI states for digital communication transceivers, as described above, may be effectuated in several forms and embodiments. Specific embodiments are described below and in the drawings with the understanding that the disclosure is to be considered an exemplification of the invention and is not intended to limit the invention to the specific embodiments illustrated in this disclosure.

Typically, digital transceiver modems include a transmission line interface that comprises a two-to-four wire converter called the hybrid. The term two wire is used to describe the duplex port of the line and the term four wire is used to describe the simplex transmit and receive ports, each being two terminal. The hybrid could be transformer-based or transformer-less. The hybrid reflects the impedances from the two wire to the four wire ports and vice versa with certain multiplication factors that are dictated by hybrid characteristics (turns ratios for transformer-based hybrids).

Digital transceiver modems typically include a transmitter Tx and a receiver Rx. Those of ordinary skill in the art recognize that the transmitter Tx and receiver Rx are generally coupled to other parts of the digital transceiver, such as an analog front end AFE. A source resistance (internal plus external) of the transmitter Tx (also characterized as the line driver) can also serve as a termination resistance for signals received from another end of the line. The source resistance is generally designed to be approximately equal to the characteristic or normal impedance of the medium, such as a twisted pair, over the considered frequency band, in accordance with the maximum Power Transfer Theorem, as explained above. This addresses impedance reflection ratios. The receiver Rx of the transceiver is generally designed to have high input impedance.

Embodiments of the invention described below incorporate one or two switches that are used to set the NI or the HI state of the transceiver while enabling the transceiver to receive signals from the line. The following illustrations are simplified for ease of comprehension as follows: (1) Although realization is generally differential, the following illustrations are single ended; and (2) Echo cancellation and Echo suppression circuitry are eliminated. Those skilled in the art will recognize that each of the following illustrations can easily be converted into a differential version for actual implementation. A detailed implementation of the third embodiment is described below.

FIG. 9 shows a first embodiment that incorporates aspects of the invention. FIG. 9 illustrates a transmitter Tx, a receiver Rx and a hybrid circuit. A single pole single throw (SPST) switch Sw1 can be used to selectively couple the transmitter Tx to the hybrid. The receiver Rx may be continuously connected to the hybrid. When the switch Sw1 is closed, the transmitter Tx is coupled to the hybrid, which is coupled to the transmission line, and the transceiver is in the NI state. The internal and external resistance of the transmitter Tx can be substantially equal to the characteristic or normal line impedance. Consequently, in the NI state, the impedance seen by signals transmitted from the other end of the line is substantially equal to the characteristic or normal line impedance modified by the hybrid reflection ratio. In the first embodiment, when the switch Sw1 is open, the transmitter Tx is not coupled to the hybrid and the transceiver is in the HI state. The source resistance in the HI state, which is dictated by the receiver resistance, then, is very high (theoretically infinite) as the path to ground through the transmitter is switched off. Consequently, the impedance seen by the line, and presented by the transceiver, would also be high.

Pursuant to a second embodiment of the invention, the transmitter Tx may be designed to present a high impedance at the output terminal(s) through a control method or configuration. In the second embodiment, the switch Sw1 may not appear as an explicit block schematic outside of the transmitter Tx, but within the transmitter Tx (internally). The system could then use this feature to set the transceiver in the HI mode in the same way as described in the first embodiment.

Pursuant to a third embodiment of the invention, shown in FIG. 10, the hybrid is selectively coupled to the transmission line by a third switch Sw3. Those skilled in the art will recognize that the third switch Sw3 can include first, second and third terminals 1, 2 and 3 with the first terminal 1 being the common terminal, and the second switch Sw2 can include fourth, fifth and sixth terminals 4, 5 and 6 with the fourth terminal 4 being the common terminal. In the third embodiment, the receiver Rx is coupled to the transmission line in the HI State through two single pole double throw switches Sw2 and Sw3. As shown in FIG. 10, the transmitter Tx and hybrid are not coupled to the transmission line in the HI state since the transceiver does not transmit signals in the HI State. In the HI state, the common terminal of the third switch 1 is connected to the third terminal of the third switch 3 while the common terminal of the second switch 4 is connected to the fifth terminal of the second switch 5.

In the NI state of the third embodiment, the transmission line is coupled to the hybrid by the third switch Sw3 and the common terminal of the third switch 1 is connected to the second terminal of the third switch 2 while the common terminal of the second switch 4 is connected to the sixth terminal of the second switch 6.

In an alternate embodiment of the third embodiment, a protection circuit shown in FIG. 10, is coupled to the receiver in the HI state. Desirably, the protection circuit protects the receiver from line surge voltages.

In a fourth embodiment of the invention, a second receiver Rx2 and fourth and fifth switches Sw4, Sw5 are incorporated. The behavior of the receiver in the first, second and third embodiments may be affected from the absence of the termination offered by the line driver (transmitter), particularly with respect to the echo suppression function. Consequently, it may be difficult to introduce switches as described in the first three embodiments without affecting the behavior of the receiver Rx1 in the HI State. In other words, it may be difficult to use the receiver Rx1 or each part of the same receiver Rx1, which was designed for the NI state, effectively in the HI state. Therefore, it might be beneficial to provide the second receiver Rx2, or parts of it, specifically designed for the HI state. The transmission line can then be decoupled from the hybrid and coupled to the second receiver Rx2 in the HI state by using the fifth switches Sw5, as depicted in FIG. 11. In the NI state the first receiver Rx1 can be coupled to the transmission line by the fifth switch and the hybrid. Also, as shown in FIG. 11, the fourth switch Sw4 can couple the first receiver to other parts of the transceiver, such as the analog front end AFE, in the NI state, and can couple the second receiver to other parts of the transceiver, such as the analog front end AFE, in the HI state. In an alternate embodiment of the fourth embodiment, a protection circuit is desirably coupled to the second receiver, as shown in FIG. 11.

TABLE 2

Relay conditions for Impedance States of the Transceiver

| Relays | | Transceiver | |
| --- | --- | --- | --- |
| K1 | K2 | State | Function |
| Operated | Operated | Normal Impedance State | Transmit and Receive |
| Operated | Released | Invalid | Invalid |
| Released | Operated | Invalid | Invalid |
| Released | Released | High Impedance State | Line Probe |

The following is a detailed description of the third embodiment of the invention. Those skilled in the art will recognize that the third embodiment described above is sufficient to make and use the third embodiment of the invention without undue experimentation.

Figure 13:
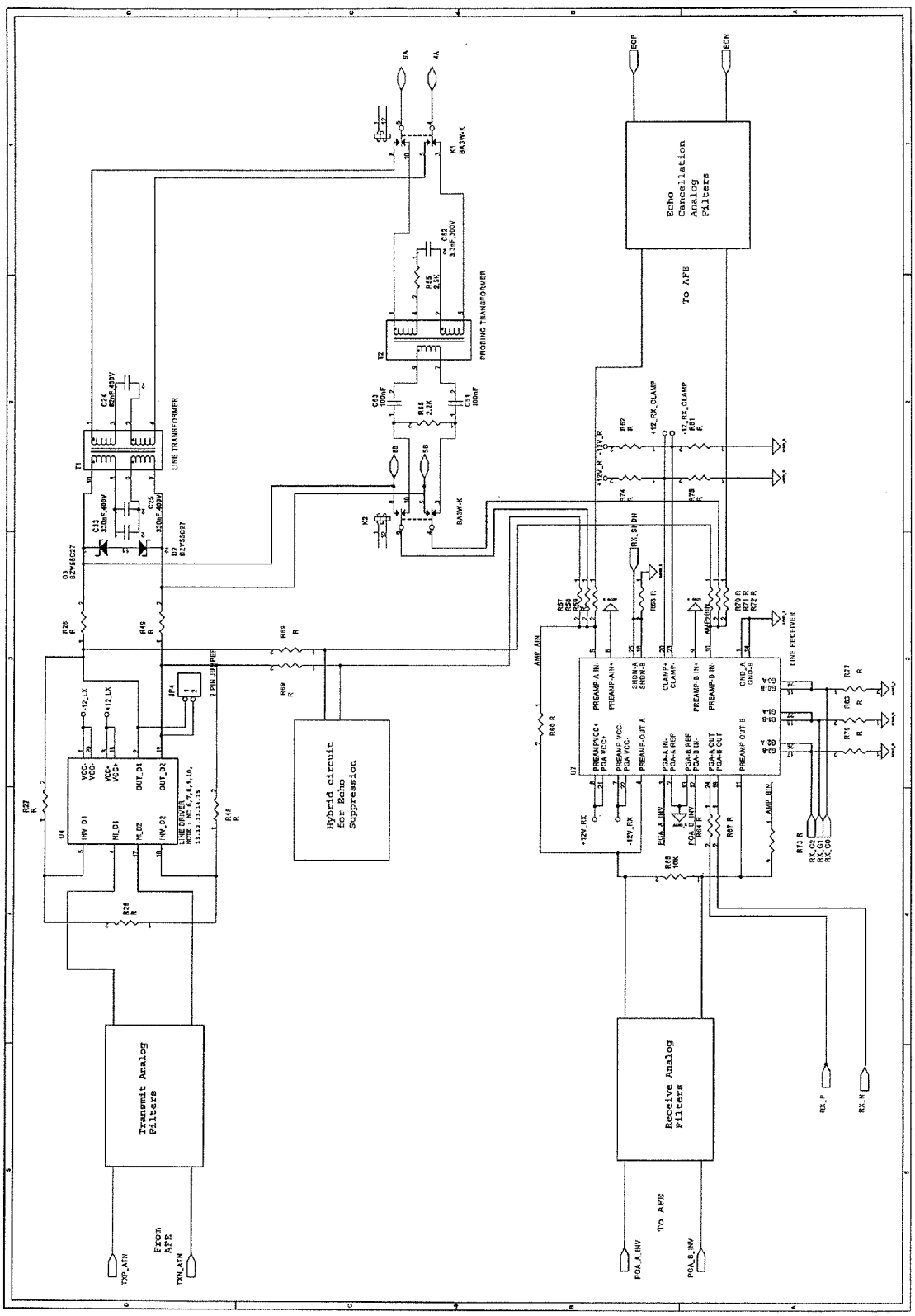
FIG. 13 depicts a detailed implementation of a high speed communication transceiver including a line driver (transmitter), a line receiver (receiver), a probing transformer (protection circuit), a line transformer (hybrid), and two electromechanical switches to effectuate high and normal impedance states pursuant to aspects of the invention.

FIG. 13 shows a detailed implementation of the High impedance state of an ADSL Modem transceiver. In the detailed implementation, the electro-mechanical relays R1, R2 together are used to change the state of the transceiver between High and Normal Impedance States. The relays can be controlled through software and/or hardware. The Probing transformer and its associated circuitry are also additional elements to implement the HI state. The rest of the circuitry is typically found in regular transceivers.

In the detailed implementation, when both relays R1, R2 are operated, as indicated in table 2, the transceiver will be in the Normal Impedance State. The transmission line, indicated by connectors 9A and 4A, is connected to the line transformer through Relay K1 and further to the line driver (transmitter). The line receiver (indicated in small print) is also connected to the line transformer through Relay K2. The Probing Transformer and its associated circuitry are isolated from the line through K1 and from the line receiver through K2. Resistors R28 and R48 are each equal to half the characteristic or normal impedance of the line (without bridged taps), and together serve as both source impedance for the transmit function and as termination impedance for the receive function. In the described NI state, the modem can perform normal transmit and receive functions.

When both the relays are released, as indicated in the table above, the transceiver will be in the High Impedance State. The line, indicated by connectors 9A and 4A, is connected to the probing transformer through the Relay K1 and further to the line receiver through Relay K2 in the HI state. The line transformer and the line driver along with resistors R28 and R48 are isolated from the line through relay K1 and from the line receiver through relay K2. The impedance seen by the line is the parallel combination of resistor R55 and the reflection of the value of resistor R85 by the turns ratio (=1) of the probing transformer. The values of R55 and R85 are much higher in value than the sum of R28 and R48 (about 25 times), therefore, the impedance seen by the line is very high (about 10 times) with respect to the characteristic or normal line impedance, which is about 100 Ohms.

The capacitors perform the filtering function for signals in the spectrum below the ADSL band and can therefore be ignored in this analysis. As a result, the modem transceiver of the detailed implementation presents a high impedance over the ADSL band of frequencies to the line and can still receive the signals on the line without disrupting them. The switches described in the four embodiments above can be realized in different ways. For example, they could be any one, or a combination of more than one of the following: (1) Mechanical, (2) Electro-mechanical, (3) Electronic, or (4) Filter. They could further be controlled manually, on command, or automatically, through hardware and/or software. Further, as those skilled in the art will recognize, although the discussion above has focussed on DSL transceivers, and ADSL transceivers in particular, the discussion is applicable to other high speed communication devices. For example, the discussion is applicable to other high speed communication transceivers, such as co-axial modems, VDSL modems, and high speed communication transmitters. In addition, as those skilled in the art will recognize, the transceivers can be connected to any line of sufficient length to be characterized as a transmission line.

From the foregoing it will be observed that numerous modifications and variations can be effectuated without departing from the true spirit and scope of the novel concepts of the invention. It is to be understood that no limitation with respect to the specific embodiments and methods illustrated is intended or should be inferred. The disclosure is intended to cover by the appended claims all such modifications as fall within the scope of the claims.

What is claimed is:

1. A method for allowing a plurality of high speed communication transceivers connected to a transmission line to effectively receive data from the transmission line, wherein each communication transceiver is capable of receiving and transmitting data in an active state, and capable of sensing and receiving data in a high impedance state and wherein the transmission line has a characteristic impedance defined by a twisted pair of conductors, the method comprising the steps of: setting a first high speed communication transceiver to the active state, the first high speed communication transceiver having a characteristic impedance of 100 ohms at a transmission frequency of the first high speed communication transceiver, the characteristic impedance of the first high speed communication transceiver being equal to the characteristic impedance of the twisted pair of conductors in the active state; setting a second high speed communication transceiver to the high impedance state; setting a third high speed communication transceiver to the high impedance state; one of the second and third high speed communication transceivers sensing and receiving a message intended for the one high speed communication transceiver; and the one high speed communication transceiver switching to an active state with a characteristic impedance equal to the characteristic impedance of the transmission line while the first high speed communication transceiver switches to the high impedance state and wherein only one of the plurality of high speed transceivers is in an active state with a characteristic impedance equal to that of the transmission line at any given time, wherein each of the high speed transceivers comprise first and second receivers, a protective circuit and a switch wherein the second receiver is coupled to the transmission line by the protective circuit and the switch.

2. The method of claim 1 wherein the step of setting the third high speed communication transceiver to the high impedance state further comprises the step of setting all of the plurality of high speed communication transceivers other than the first high speed communication transceiver to the high impedance state.

3. The method of claim 1 further including the steps of receiving data indicating an intended transceiver with the second and third transceivers, and temporarily setting the intended transceiver to the active state.

4. The method of claim 1 wherein the first transceiver is a central office transceiver connected to the transmission line at a first end, and the second and third high speed communication transceivers are remote transceivers connected to a transmission line at a second end.

5. A method for allowing a plurality of high speed communication transceivers connected to a transmission line to effectively receive data from the transmission line, wherein each communication transceiver is capable of receiving and transmitting data in an active state, and capable of sensing and receiving data in a high impedance state and wherein the transmission line has a characteristic impedance defined by a twisted pair of conductors, the method comprising the steps of: setting a first high speed communication transceiver to the active state, the first high speed communication transceiver having a characteristic impedance of 100 ohms at a transmission frequency of the first high speed communication transceiver, the characteristic impedance of the first high speed communication transceiver being equal to the characteristic impedance defined by the twisted pair of conductors in the active state; setting a second high speed communication transceiver to the high impedance state; the second high speed communication transceiver sensing and receiving a message intended for the second high speed communication transceiver; and the second high speed communication transceiver switching to an active state with a characteristic impedance equal to the characteristic impedance of the transmission line while the first high speed communication transceiver switches to the high impedance state and wherein only one of the plurality of high speed transceivers is in an active state with a characteristic impedance equal to that of the transmission line at any given time, wherein each of the high speed transceivers comprise first and second receivers, a protective circuit and a switch wherein the second receiver is coupled to the transmission line by the protective circuit and the switch.

6. The method of claim 5 further including the step of receiving data indicating an intended transceiver of the first and second transceivers, and resetting the intended transceiver to the active state and resetting the other transceiver to the high impedance state when the intended transceiver initially was set to the high impedance state.

7. The method of claim 5 further including the step of resetting one of the first and second transceivers to the active state based on a protocol, and transmitting data with the reset transceiver.

8. The method of claim 7 wherein the protocol is a time slot based protocol.

9. The method of claim 7 wherein the protocol is a line sensing based protocol.

10. A communication system that allows a plurality of high speed communication transceivers connected to a transmission line to effectively receive data from the transmission line, wherein each communication transceiver is capable of receiving and transmitting data in an active state, and capable of sensing and receiving data in a high impedance state, the communication system comprising: a first means for receiving and transmitting data comprising a first setting means for setting the first means to the active state having a characteristic impedance of 100 ohms at a transmission frequency of the first means, the characteristic impedance of the first means being equal to the characteristic impedance defined by a twisted pair of conductors and to the high impedance state; a second means for receiving and transmitting data comprising a second setting means for setting the second means to the active state having a characteristic impedance of 100 ohms at a transmission frequency of the second means, the characteristic impedance of the second means being equal to the characteristic impedance defined by the twisted pair of conductors and to the high impedance state; a third means for receiving and transmitting data comprising a third setting means for setting the third means to the active state having a characteristic impedance of 100 ohms at a transmission frequency of the third means, the characteristic impedance of the third means being equal to the characteristic impedance defined by the twisted pair of conductors and to the high impedance state; a fourth means for carrying data, wherein the first, second and third means being connected to the fourth means and wherein fourth means has a characteristic impedance of 100 ohms at a transmission frequency of the fourth means, the characteristic impedance of the fourth means being equal to the characteristic impedance defined by the twisted pair of conductors; a respective switch associated with each of the first, second and third means for receiving and transmitting data, the respective switch functioning to switch the means for receiving and transmitting data from the high impedance state to the active state upon sensing and receipt of data intended for the means for receiving and receiving data and to the high impedance state otherwise and wherein only one of the first, second and third means for receiving and transmitting data is in an active state with a characteristic impedance equal to that of the transmission line at any given time, wherein each of the means for receiving and transmitting data comprise first and second receivers, a protective circuit and a switch wherein the second receiver is coupled to the transmission line by the protective circuit and the switch.

* * * * *